US011050658B2

(12) United States Patent
Arunachalam et al.

(10) Patent No.: US 11,050,658 B2
(45) Date of Patent: Jun. 29, 2021

(54) IOAM-BASED QUALITY OF EXPERIENCE PROPAGATION TO ENDPOINTS AND SEAMLESS SWITCHOVER TO ALTERNATE CALL PATH

(71) Applicant: Cisco Technology, Inc., San Jose, CA (US)

(72) Inventors: Chidambaram Arunachalam, Cary, NC (US); Gonzalo Salgueiro, Raleigh, NC (US); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 62 days.

(21) Appl. No.: 16/131,209

(22) Filed: Sep. 14, 2018

(65) Prior Publication Data
US 2020/0092197 A1   Mar. 19, 2020

(51) Int. Cl.
*H04L 12/28*   (2006.01)
*H04L 12/707*   (2013.01)
(Continued)

(52) U.S. Cl.
CPC ............ *H04L 45/22* (2013.01); *H04L 45/745* (2013.01); *H04L 69/22* (2013.01)

(58) Field of Classification Search
CPC ....... H04L 24/22; H04L 24/745; H04L 69/22; H04L 65/80; H04L 12/5692; H04L 12/66; H04M 7/0057; H04M 15/00; H04M 2203/404; H04W 24/10; H04W 72/10; H04W 72/1231; H04W 88/06
See application file for complete search history.

(56) References Cited

U.S. PATENT DOCUMENTS 6,154,445 A   11/2000 Farris et al.
6,370,112 B1 *  4/2002 Voelker ................... H04L 45/00
                                              370/218
(Continued)

OTHER PUBLICATIONS

F. Brockners, Data Fields for In-Situ AOM, pp. 1-29, pub Sep. 4, 2017.*

(Continued)

*Primary Examiner* — Stephen M D'Agosta
(74) *Attorney, Agent, or Firm* — Edell, Shapiro & Finnan, LLC

(57) ABSTRACT

A system for switching from a first communication session between two endpoints to a secondary communication session when media degradation is detected is disclosed. A first endpoint is included within a first enterprise network and a second endpoint is included within a second enterprise network. The first enterprise network includes a call controller and a plurality of session border controllers (SBCs). The SBC in the first communication session detects media degradation and notifies the first endpoint of the media degradation. The first endpoint directs the call controller to establish a secondary communication session with the second endpoint when there is sufficient media degradation. The call controller directs a second SBC to establish the secondary communication session with the second endpoint. When the secondary communication session is established, the call controller directs the first endpoint to send media data using the second SBC.

20 Claims, 8 Drawing Sheets

(51) Int. Cl.
  *H04L 12/741* (2013.01)
  *H04L 29/06* (2006.01)

(56) References Cited

U.S. PATENT DOCUMENTS

| | | | | |
|---|---|---|---|---|
| 6,389,005 | B1* | 5/2002 | Cruickshank | H04L 12/2856 370/352 |
| 6,434,134 | B1* | 8/2002 | La Porta | H04L 29/12301 370/338 |
| 6,449,259 | B1 | 9/2002 | Allain et al. | |
| 6,654,359 | B1* | 11/2003 | La Porta | H04L 29/12216 370/328 |
| 6,690,651 | B1 | 2/2004 | Lamarque, III et al. | |
| 6,704,320 | B1* | 3/2004 | Narvaez | H04L 45/02 370/408 |
| 6,721,899 | B1* | 4/2004 | Narvaez-Guarnieri | H04L 45/02 370/218 |
| 7,012,888 | B2 | 3/2006 | Schoeneberger et al. | |
| 7,152,179 | B1* | 12/2006 | Critchfield | H04L 12/56 714/4.11 |
| 7,184,437 | B1* | 2/2007 | Cole | H04L 45/02 370/392 |
| 7,613,170 | B1* | 11/2009 | Grabelsky | H04L 12/5692 370/352 |
| 7,792,019 | B1* | 9/2010 | Ger | H04M 3/58 370/228 |
| 7,860,017 | B2* | 12/2010 | Montwill | H04L 41/0677 370/242 |
| 7,953,070 | B1* | 5/2011 | Agarwal | H04M 7/0078 370/352 |
| 8,213,915 | B1* | 7/2012 | Upadhyay | H04L 67/145 455/414.1 |
| 8,634,534 | B1 | 1/2014 | Brandt et al. | |
| 9,660,860 | B1* | 5/2017 | Rekhter | H04L 41/0631 |
| 2002/0181485 | A1* | 12/2002 | Cao | H04L 45/50 370/419 |
| 2003/0193890 | A1* | 10/2003 | Tsillas | H04L 45/02 370/216 |
| 2007/0019559 | A1* | 1/2007 | Pittelli | H04L 43/045 370/248 |
| 2008/0130489 | A1* | 6/2008 | Chao | H04L 45/48 370/219 |
| 2008/0137556 | A1* | 6/2008 | Park | H04L 29/1232 370/255 |
| 2010/0034362 | A1* | 2/2010 | Phelps | H04M 3/42221 379/88.19 |
| 2010/0172237 | A1* | 7/2010 | Savage | H04L 45/123 370/228 |
| 2010/0177633 | A1* | 7/2010 | Bader | H04L 47/70 370/230 |
| 2010/0182907 | A1* | 7/2010 | Pinter | H04L 47/18 370/235 |
| 2012/0082158 | A1* | 4/2012 | Reddy | H04W 80/045 370/389 |
| 2013/0121142 | A1* | 5/2013 | Bai | H04L 45/28 370/228 |
| 2013/0336103 | A1* | 12/2013 | Vasseur | H04L 45/50 370/216 |
| 2017/0366674 | A1* | 12/2017 | Hodge | H04M 3/08 |

OTHER PUBLICATIONS

F. Brockners, et al., "Data Fields for In-situ OAM", draft-ieff-ippm-ioam-data-03, Jun. 27, 2018, ippm, Internet-Draft, 35 pages.

"Automated Alternate Routing Group Configuration", Cisco Unified Communications Manager Administration Guide, OL-24919-01, 4 pages.

"Automated Alternate Routing Configuration", Document ID: 113478, Cisco Systems, Inc., Mar. 30, 2012, 5 pages.

* cited by examiner

IOAM-BASED QUALITY OF EXPERIENCE PROPAGATION TO ENDPOINTS AND SEAMLESS SWITCHOVER TO ALTERNATE CALL PATH

TECHNICAL FIELD

The present disclosure relates to multimedia communication sessions.

BACKGROUND

Endpoints in two enterprise computer networks may send data, such as audio and/or visual data, to each other to communicate or collaborate with each other, for example. Each of the enterprise computer networks may further include at least one call controller and at least one session border controller (SBC). The call controller in a given enterprise computer network may be used to setup a communication session between the endpoints. The SBC of a given enterprise computer network may be located at the edge of the given enterprise computer network. Further, the SBC may connect, via a service provider network, to an SBC in the second enterprise computer network to exchange data.

DESCRIPTION OF EXAMPLE EMBODIMENTS

Overview

In one example embodiment, a method to detect and notify other network devices of media degradation is disclosed. Specifically, the method includes sending a data packet in a first communication session from a first endpoint to a second endpoint over a first call leg of the first communication session and receiving a data packet in the first communication session from the second endpoint to the first endpoint over the first call leg. The method then determines whether performance of the communication session has degraded based on the sent or received data packets. When the performance of the communication session has degraded, the method incorporates information associated with the performance of the communication session into a header of the received packet and provides the received packet to the first endpoint of the first communication session.

In another example embodiment, a method to establish a secondary communication session in response to media degradation detected in a first communication session is disclosed. The method includes receiving, from a first endpoint communicating with a second endpoint in a first communication session, a request to establish a second communication session with the second endpoint. In response to receiving the request, the method directs a first network device to establish a communication session with the second endpoint. The method then receives from the first network device a notification indicating that the first network device has established the communication session with the second endpoint. In response to the notification, the method directs the first endpoint to send communications to the second endpoint via the first network device.

Example Embodiments

Figure 1:
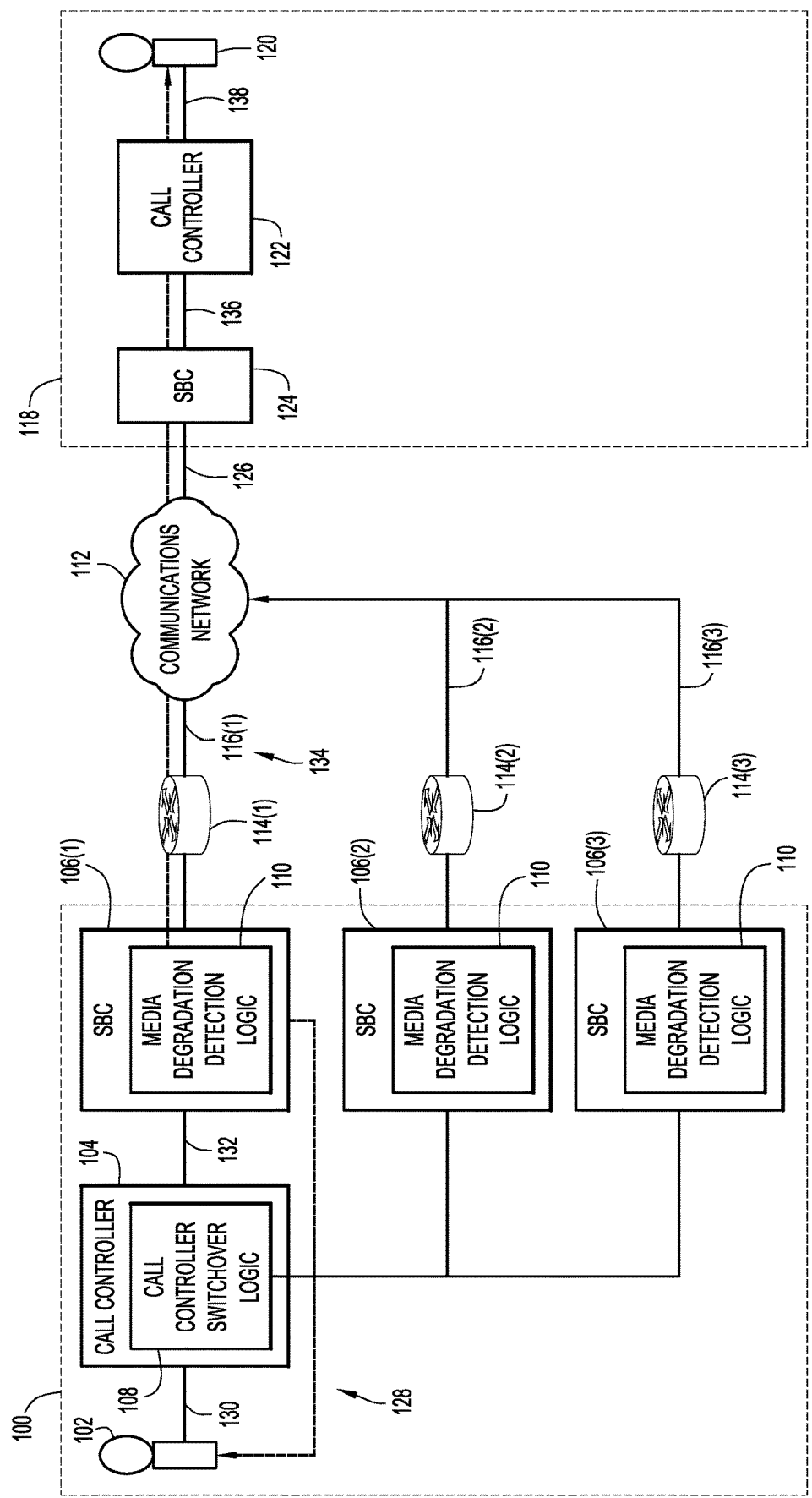
FIG. 1 is a block diagram of two enterprise computer networks that enable endpoints within the computer networks to exchange data, according to an example embodiment.

With reference made to FIG. 1, shown are two enterprise computer networks connected by a communications network to enable communication between endpoints in the two enterprise computer networks, according to an example embodiment. The first enterprise computer network 100 may include a first endpoint 102, a first call controller 104, and three session border controllers (SBCs) 106(1)-106(3). It should be appreciated that any number of endpoints, call controllers, and SBCs may be a part of the first enterprise computer network 100. The first call controller 104 may include call control switchover logic 108, as described in more detail herein. Each of the SBCs 106(1)-106(3) may include media degradation detection logic 110, also as described in more detail herein.

The first endpoint 102 may be connected to the first call controller 104, which in turn may be connected to each of the SBCs 106(1)-106(3). The first call controller 104 may be used to setup a communication session. During a communication session, the first endpoint 102 may also be connected to at least one of the SBCs 106(1)-106(3). Media data, such as audio and/or visual data, to be sent or received by the first endpoint 102 during a communication session may be provided to the SBC to which the first endpoint 102 is connected. In other words, the first call controller 104 may not be within a data path during a communication session.

Each of the SBCs 106(1)-106(3) may be connected to a communications network 112 via a network element 114(1)-114(3), respectively. The network elements 114(1)-114(3) may be, for example, a router, a switch, a proxy, etc. For example, each of the SBCs 106(1)-106(3) may use a different service provider connection 116(1)-116(3) to access the communications network 112, also labeled Session Initial Protocol (SIP) Carrier 1, SIP Carrier 2 and SIP Carrier 3, respectively.

The second enterprise computer network 118 may include a second endpoint 120, a second call controller 122, and an SBC 124. It should be appreciated that any number of endpoints, call controllers, and SBCs may be included within the second enterprise computer network 118. The second endpoint 120 may be connected to the second call controller 122, which in turn may be connected to the SBC 124. The second call controller 122 may be used to setup the communication session. During a communication session, the second endpoint 120 may also be connected to the SBC 124. During the communication session, data received and sent from the second endpoint 120 may be obtained and provided to the SBC 124. In other words, the second call controller 122 may not be in a data path during a communication session. The SBC 124 may be connected to the communications network 112 via a service provider connection 126.

A communication session 128, as indicated by a dashed line, between the first endpoint 102 and the second endpoint 120 may include a plurality of call legs. For example, a first call leg 130 may exist between the first endpoint 102 and the first call controller 104. Assuming for exemplary purposes only that the communication session is using SBC 106(1), a second call leg 132 may exist between the first call controller 104 and SBC 106(1). A third call leg 134 may exist between SBC 106(1) and SBC 124 via network element 114(1). A fourth call leg 136 may exist between SBC 124 and the second call controller 122. A fifth call leg 138 may exist between the second call controller 122 and the second endpoint 120. Taken together, the call legs 130, 132, 134, 136, 138 may form the communication session 128 between the first endpoint 102 and the second endpoint 120.

Figure 2A:
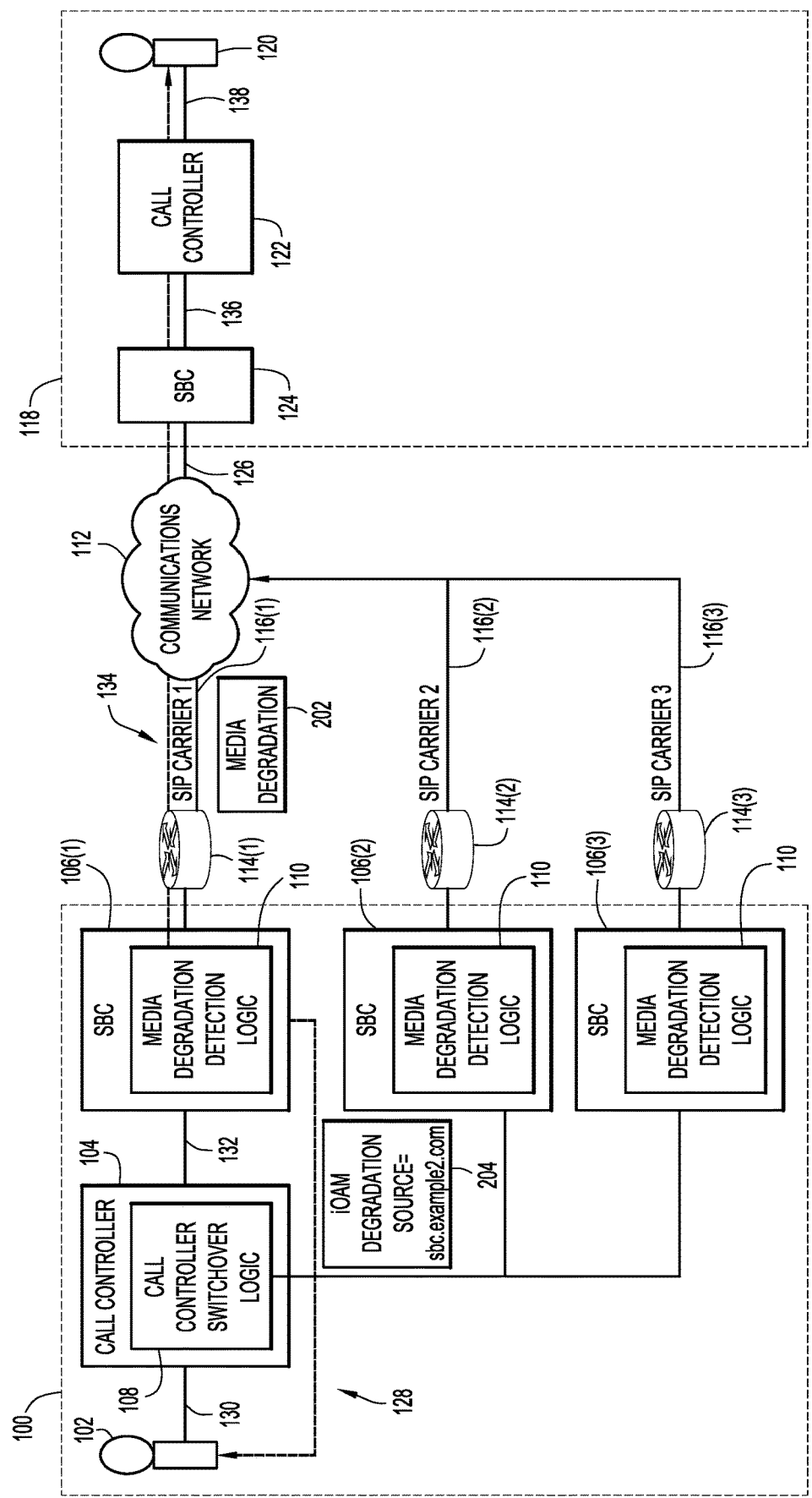
FIGS. 2A-2C are block diagrams depicting operations performed by a first enterprise computer network to reconfigure a communication session between a first endpoint and a second endpoint when media degradation has been detected, according to an example embodiment.
Figure 2B:
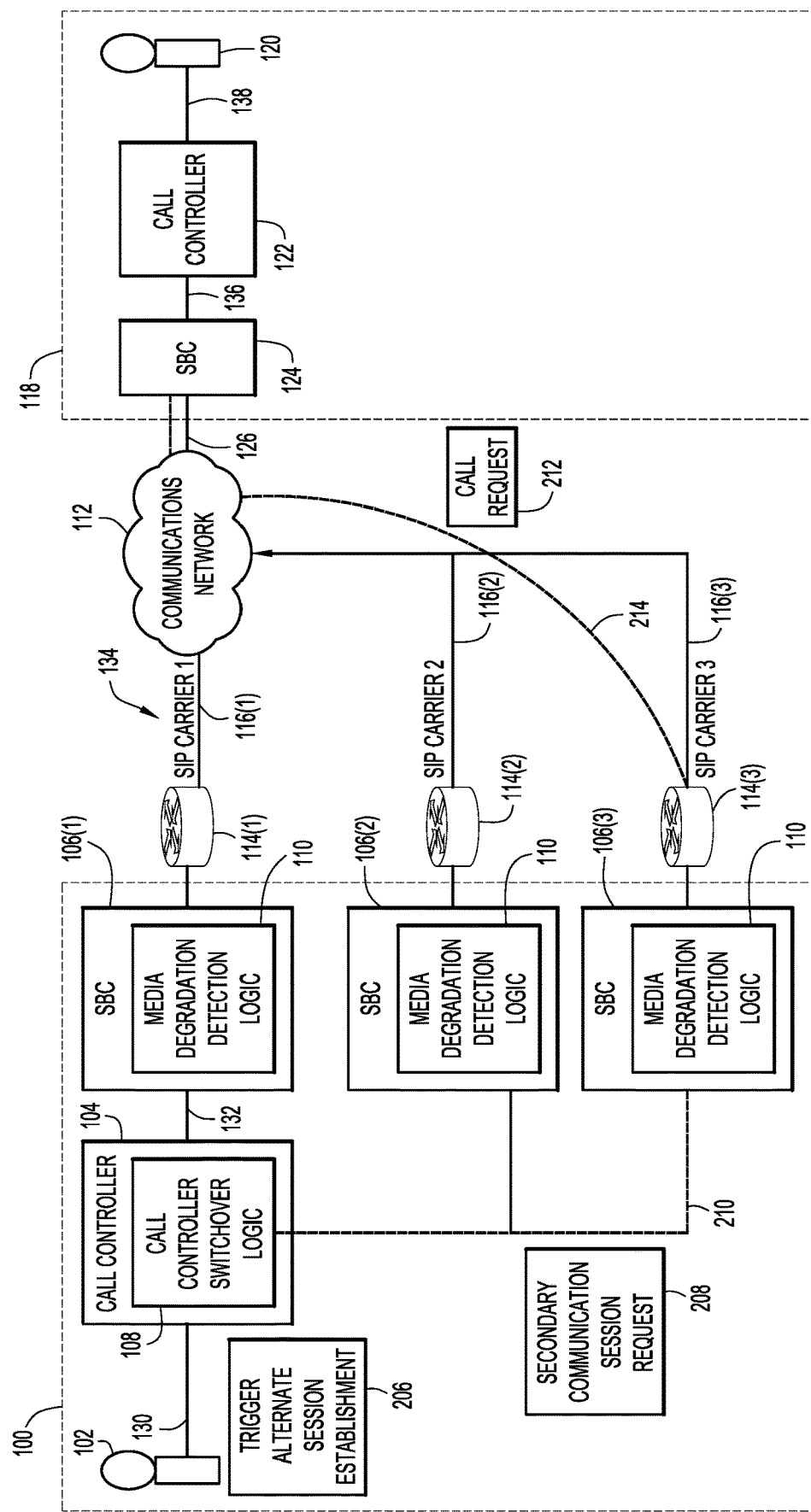
Figure 2C:
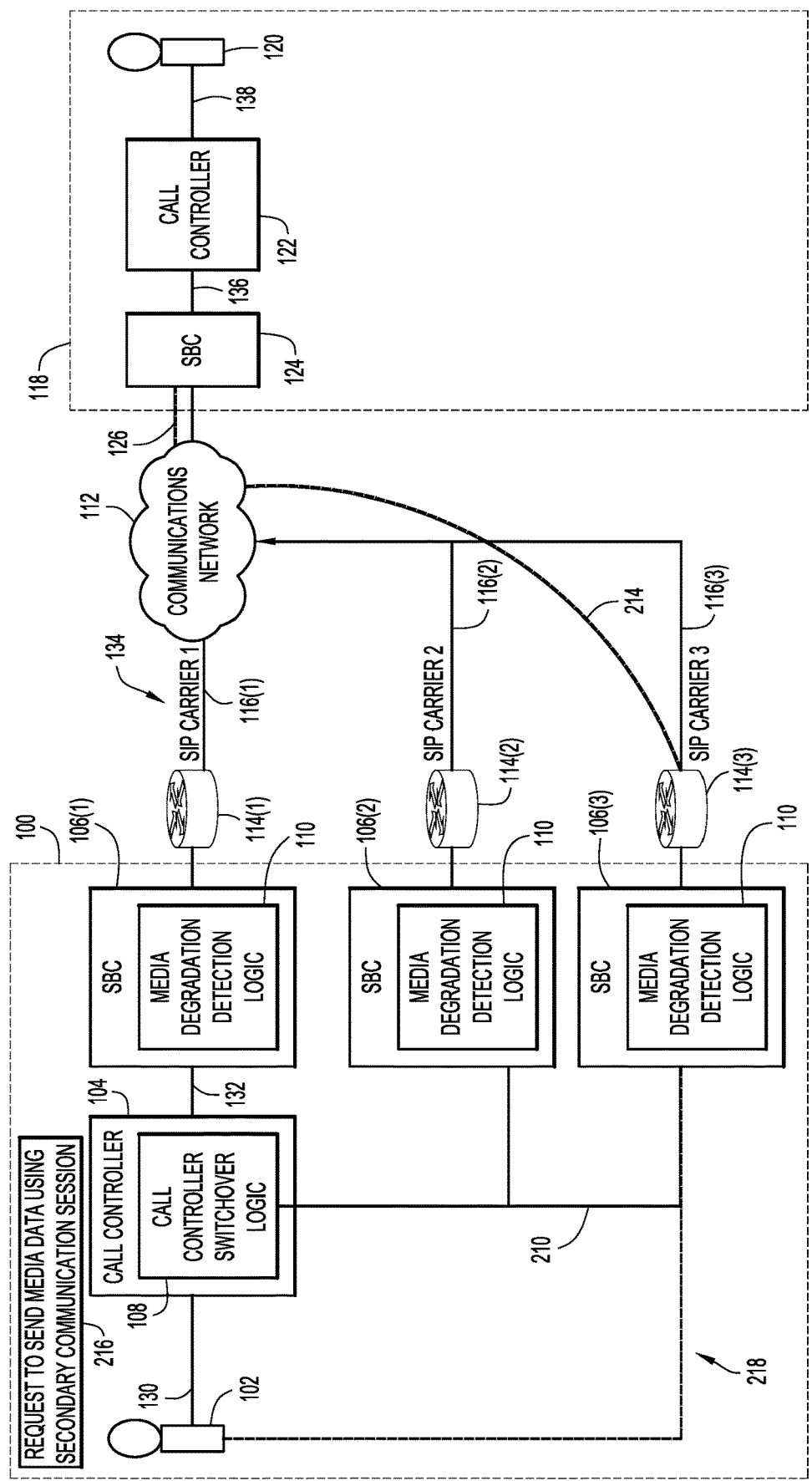

Turning to FIGS. 2A-2C, and with continuing reference to FIG. 1, shown are operations taken by the first enterprise computer network 100 to reconfigure the first communication session 128 between the first endpoint 102 and the second endpoint 120 when media degradation has been detected, according to an example embodiment. In this example, the first communication session 128 exists between the first endpoint 102 and the second endpoint 120. The first call controller 104 has configured the first communication session 128 so that the first endpoint 102 provides data to, and obtains data from, SBC 106(1).

Turning specifically to FIG. 2A, SBC 106(1) has detected media degradation as shown at 202 in the outbound call leg 134, i.e., the call leg from SBC 106(1) to SBC 124 via service provider connection 116(1). For example, SBC 106(1) may detect packet loss, packet delay, and/or packet jitter in the outbound call leg 134. For example, the media degradation detection logic 110 may detect the media degradation 202 in the outbound call leg 134. In response to detecting media degradation 202, the SBC 106(1), through execution of the media degradation detection logic 110, may notify the first endpoint 102 of the media degradation 202. For example, the media degradation detection logic 110 may include in-situ Operations, Administration, and Maintenance (iOAM) information as shown at 204 within media data packets to notify the first endpoint 102 of the media degradation 202. The media data packets may be, for example, Real-time Transport Protocol (RTP) packets. The iOAM information 204 may include the source of media degradation and the type of media degradation, such as packet loss, packet delay, packet jitter, or any other indications of media degradation, as well as details about the inbound call leg 132 and outbound call leg 134. Information regarding the inbound call leg 132 and outbound call leg 134 may include the respective call identifiers. The iOAM information 204 may also include a session identifier for the first communication session 128 between the first endpoint 102 and the second endpoint 120. The iOAM information 204 may be sent to the first endpoint 102 for the duration of the media degradation 202. The iOAM format is described in more detail herein.

Turning to FIG. 2B, and with continuing reference to FIG. 2A, shown are operations performed by the first endpoint 102, the first call controller 104, and SBC 106(3) after the first endpoint 102 has received the iOAM information 204 from SBC 106(1), according to an example embodiment. In response to receiving the iOAM information 204, the first endpoint 102 may determine whether to trigger an alternate session establishment request 206. The first endpoint 102 may trigger the alternate session establishment request 206 by comparing the iOAM information 204 to predetermined thresholds. For example, the first endpoint 102 may compare a percentage of packets loss as indicated in the iOAM information 204 to a predetermined threshold for percentage of packets loss. If, for example, the iOAM information 204 has a percentage of packets loss greater than the predetermined threshold for a percentage of packets loss, then the first endpoint 102 may trigger the alternate session establishment request 206. The first endpoint 102 may provide the alternate session establishment request 206 to the first call controller 104 in, for example, a SIP request message. The SIP request message may be a SIP INFO message, for example. The alternate session establishment request 206 may include the source of the media degradation. Here, the source of media degradation is SBC 106(1). Moreover, the alternate session establishment request 206 may include information regarding the inbound call leg 132 and outbound call leg 134, such as the call identifiers, of the source of media degradation. The alternate session establishment request 206 may also include the session identifier of the first communication session 128.

In response to receiving the alternate session establishment request 206, the first call controller 104 may perform a lookup for the call leg 132 between the first call controller and SBC 106(1) by using the call identifier and/or session identifier provided by the first endpoint 102 in the alternate session establishment request 206. Based on this lookup, the first call controller 104 may begin to establish a secondary communication session between the first endpoint 102 and the second endpoint 120 by sending a secondary communication session request 208 to a next available SBC. The secondary communication session request 208 may establish a call 210 with the next available SBC. For example purposes only, the next available SBC is SBC 106(3). The secondary communication session request 208 may be in the form of a SIP INVITE. The secondary session request 208 may include a header that includes the session identifier of the first communication session 128 between the first endpoint 102 and the second endpoint 120.

In response to receiving the secondary communication session request 208, SBC 106(3) may send a request 212 to SBC 124 that includes the session identifier of the first communication session between the first endpoint 102 and the second endpoint 120 to establish a call 214 with SBC 124. Because each of the SBCs 106(1)-106(3) uses a different service provider connection 116(1)-116(3), the secondary communication session request traverses a different path to SBC 124.

In response to receiving the request 212 from SBC 106(3), SBC 124 may accept the request and the call 214 is established. Moreover, SBC 124 may determine the associated first communication session 128 between the first endpoint 102 and the second endpoint 120 using the first communication session identifier. SBC 106(3) may send an answer to the request 208 from the first call controller 104 when it receives an answer for the request 212 from SBC 124. The call leg 210 between first call controller 104 and SBC 106(3), and the call leg 214 between SBC 106(3) and SBC 124 thus established. It should be noted that the call legs 130, 132, 134, 136, 138 of the first communication session 128 are still operational when the call legs 210, 214 are established. Therefore, the first endpoint 102 and the second endpoint 120 may still send and receive media data using the first communication session 128 while the secondary communication session is being established.

Turning to FIG. 2C, and with continuing reference to FIGS. 2A and 2B, in response to receiving an answer on the call leg 210 between the first call controller 104 and SBC 106(3) and establishing the call leg 210, the first call controller 104 may request 216 the first endpoint 102 to send media data to SBC 106(3) instead of to SBC 106(1) across the secondary communication session 218 which includes the call legs 130, 210, 214, 136 and 138. Moreover, the first call controller 104 may terminate the call leg 132 between the first call controller 104 and SBC 106(1). In turn, SBC 106(1) may terminate the call leg 134 between SBC 106(1) and SBC 124, thereby terminating the first communication session 128 between the first endpoint 102 and the second endpoint 120.

These techniques enable the first call controller 104 and the SBCs 106(1)-106(3) to maintain a high quality communication experience without requiring intervention by a user of the first endpoint 102 by providing a seamless switchover to an alternate path. In the example above, the user of the first endpoint 102 does not need to terminate the first communication session 128 and establish the second communication session 218. The first endpoint 102, the first call controller 104, and the SBCs 106(1)-106(3) establish the secondary communication session 218 without requiring input from the user of the first endpoint 102. Also in the example above, a seamless switchover occurs because the first communication session 128 is not terminated until the secondary communication session 218 is established.

Figure 3:
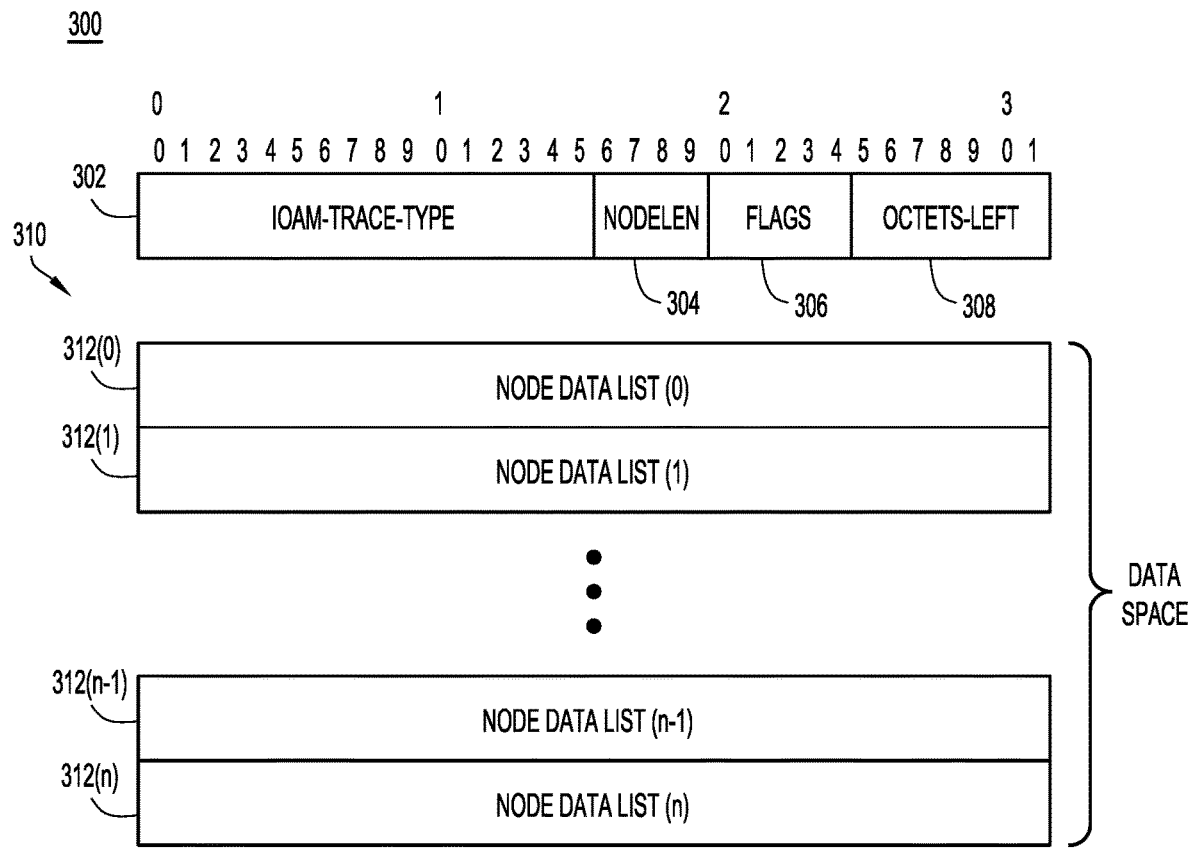
FIG. 3 depicts an In-Situ Operation, Administration, and Maintenance (iOAM) header employed according to the techniques presented herein, according to an example embodiment.

Turning now to FIG. 3, shown is an iOAM header 300 that may be populated with information used in the system and methods presented herein, according to an example embodiment. The iOAM header 300 may include a trace type field 302, a node data length field 304, a flags field 306, an octets left field 308, and a node data list 310 that may include a plurality of node data entries 312(0)-312(n). As described above, an SBC that detects media degradation may notify an endpoint of the degradation using an iOAM record. The iOAM fields may be added to media data the SBC provides to the endpoint. Therefore, no additional network traffic is generated to notify the endpoint of media degradation.

The trace type field 302 may be a 16 bit identifier that identifies the data types included in the plurality of node data entries 312(0)-312(n). For example, the trace type field 302 may indicate that the plurality of node data entries 312(0)-312(n) include ingress and egress interface identifiers. For example, an SBC may include ingress and egress interface identifiers to indicate the interfaces across which inbound and outbound call legs are setup. The trace type field 302 may also indicate that the plurality of node data entries 312(0)-312(n) include application data. For example, the SBC may include metrics related to media degradation, such as packet loss, packet delay, and/or packet jitter, call identifier of the inbound and outbound call legs and session identifier of the first communication session as application data. The node data length field 304 may be a four bit unsigned integer that indicates a length of data added by the SBC. The flags field 306 may be five bits and may indicate whether overflow or loopback is present. The octets left field 308 may be a seven bit unsigned integer that indicates a number of octets remaining for recording SBC data. The node data list 310 may include an entry from the SBC that includes the media degradation information, inbound and outbound call leg identifiers and session identifier of the first communication session. The SBC may continue to include iOAM information as long as the SBC detects media degradation.

In response to receiving media packets with iOAM information, the endpoint may parse the iOAM information to determine whether to trigger the alternate session establishment request, as described above.

Figure 4:
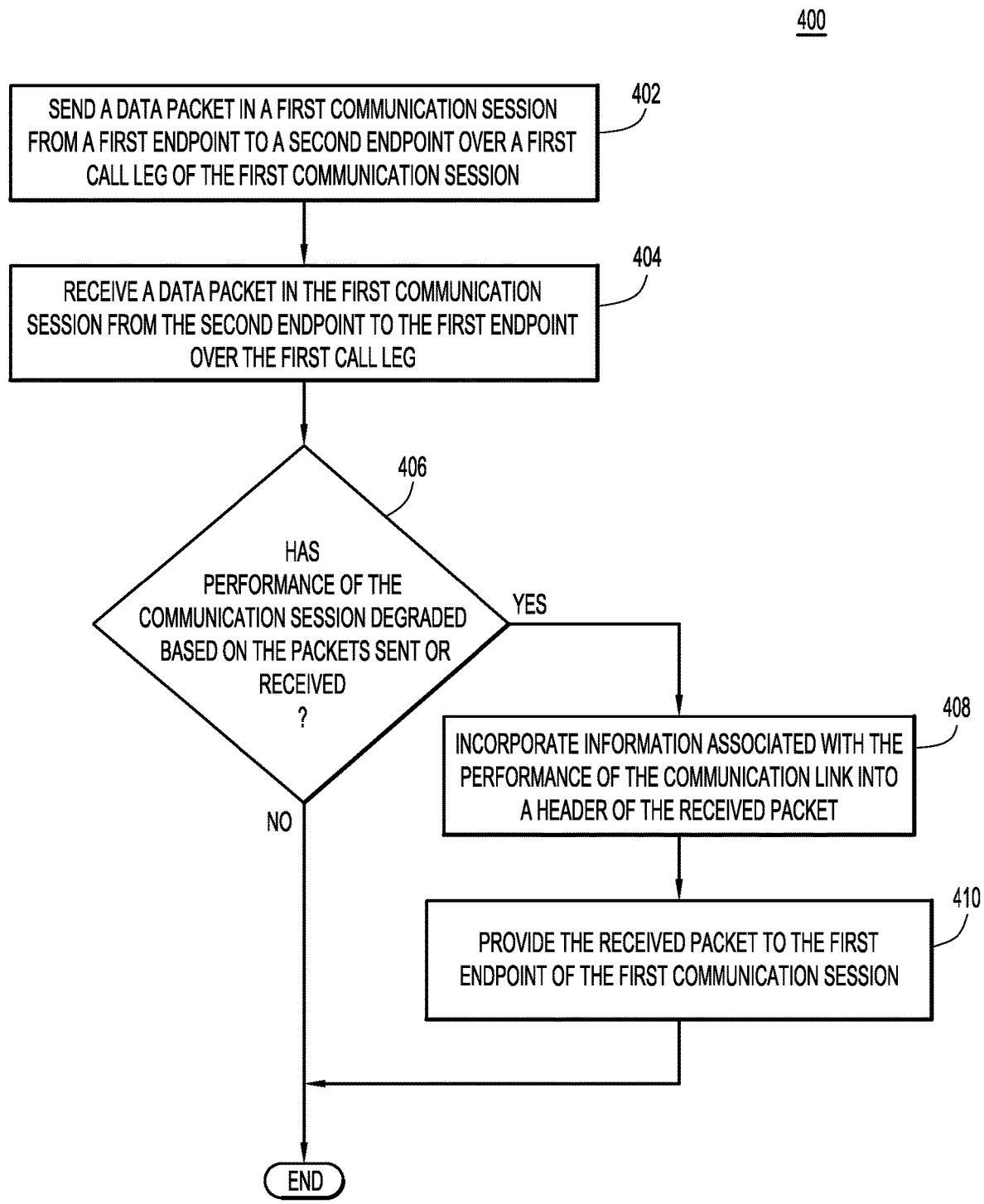
FIG. 4 is a flowchart depicting a method performed by a session border controller (SBC) to establish a secondary communication session between the first endpoint and the second endpoint, according to an example embodiment.

Turning to FIG. 4, shown is a flowchart depicting a method 400 performed by an SBC to establish a secondary communication session between the first endpoint and the second endpoint, according to an example embodiment. For example, the SBC may perform this method 400 when executing the media degradation detection logic 110.

At operation 402, the SBC may send a data packet in a first communication session from a first endpoint to a second endpoint over a communication link. For example, the data packets may include audio and/or visual (e.g., video) data, for example.

At operation 404, the SBC may receive a data packet in the first communication session from the second endpoint to the first endpoint over the communication link. Like the sent data packet, the received data packet may include audio and/or visual data, for example. It should be appreciated that operations 402 and 404 may be in reverse order or may occur simultaneously.

At operation 406, the SBC may determine whether the performance of the communication session has degraded. For example, the SBC may determine the performance has degraded based on the sent or received data packets. More specifically, the SBC may determine if there is media degradation when packet loss metrics, packet delay metrics, and/or packet jitter metrics exceed a predetermined threshold or fall outside of a predetermined range. When the SBC has detected there is no media degradation, the method 400 may end. However, if the SBC has detected media degradation, the method 400 may proceed to operation 408.

At operation 408, the SBC may incorporate the information associated with the performance of the communication session into a header of the received data packet. For example, the information may be included in an iOAM record of an iOAM header of a packet. Within the iOAM record, the SBC may include the packet loss metrics, the packet delay metrics, and/or the packet jitter metrics. Moreover, the SBC may include inbound and outbound call legs information within the iOAM record, such as call leg identifiers of the inbound and outbound call legs. Additionally, the SBC may include a session identifier of the first communication session in the iOAM record.

At operation 410, the SBC may provide or send the received data packet, including the iOAM record, to the first endpoint.

Figure 5:
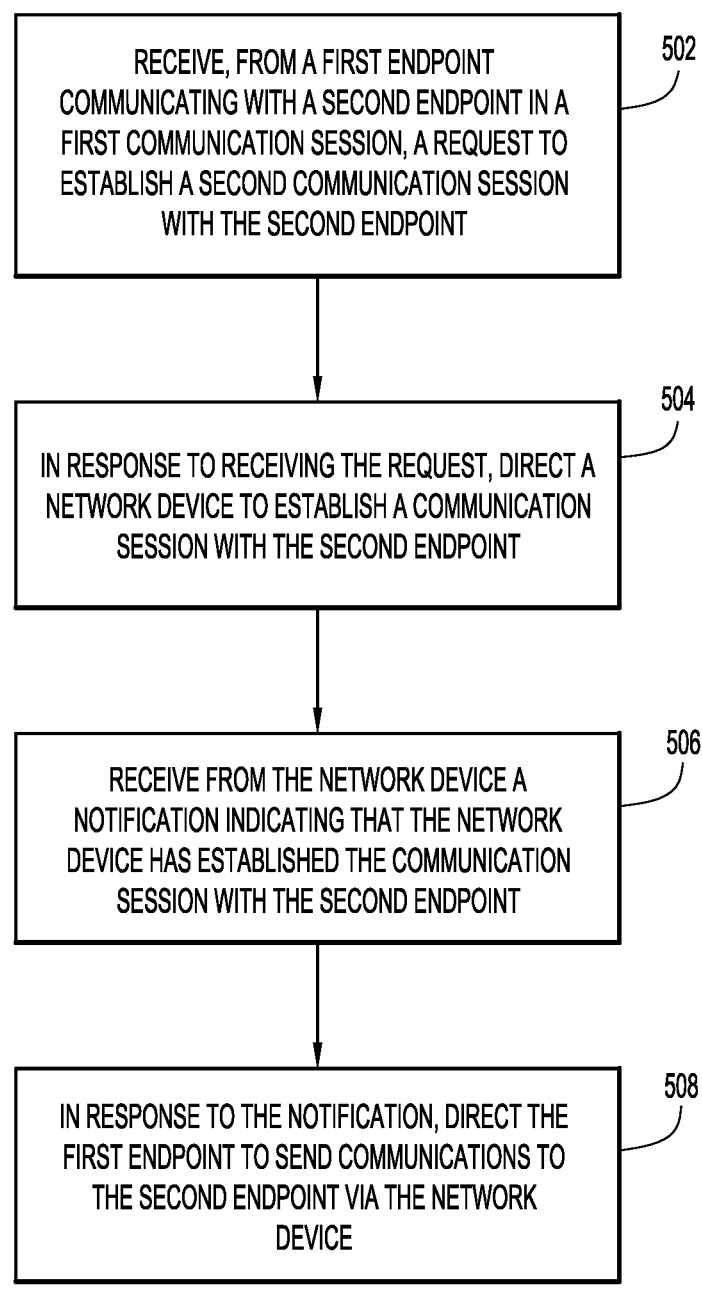
FIG. 5 is a flowchart depicting a method performed by a call controller to establish a secondary communication session between a first endpoint and a second endpoint, according to an example embodiment.

Turning to FIG. 5, shown is a flowchart depicting a method 500 performed by a call controller to establish a secondary communication session between a first endpoint and a second endpoint, according to an example embodiment. The call controller may perform this method 500 when executing the call control switchover logic 108.

At operation 502, the call controller may receive a secondary communication establishment request. For example, the call controller may receive the secondary communication establishment request from the first endpoint. As described above, the call controller may receive the secondary communication establishment request when the first endpoint has determined that the media degradation is sufficient to establish a secondary communication session with the second endpoint.

At operation 504, in response to receiving the secondary communication session establishment request, the call controller may direct a network device, such as an SBC, to establish a secondary communication session with the second endpoint. For example, the call controller may determine which SBC is being used in the first communication session. Based on the SBC being used in the first communication session, the call controller may determine a next available SBC. The call controller may direct the next available SBC to establish the secondary communication session with the second endpoint. When directing the next available SBC, the call controller may provide the first communication session identifier to the next available SBC.

At operation 506, the call controller may receive a notification from the next available SBC indicating that the secondary communication session has been established.

At operation 508, the call controller may direct the first endpoint to send data to the next available SBC using the secondary communication session.

Figure 6:
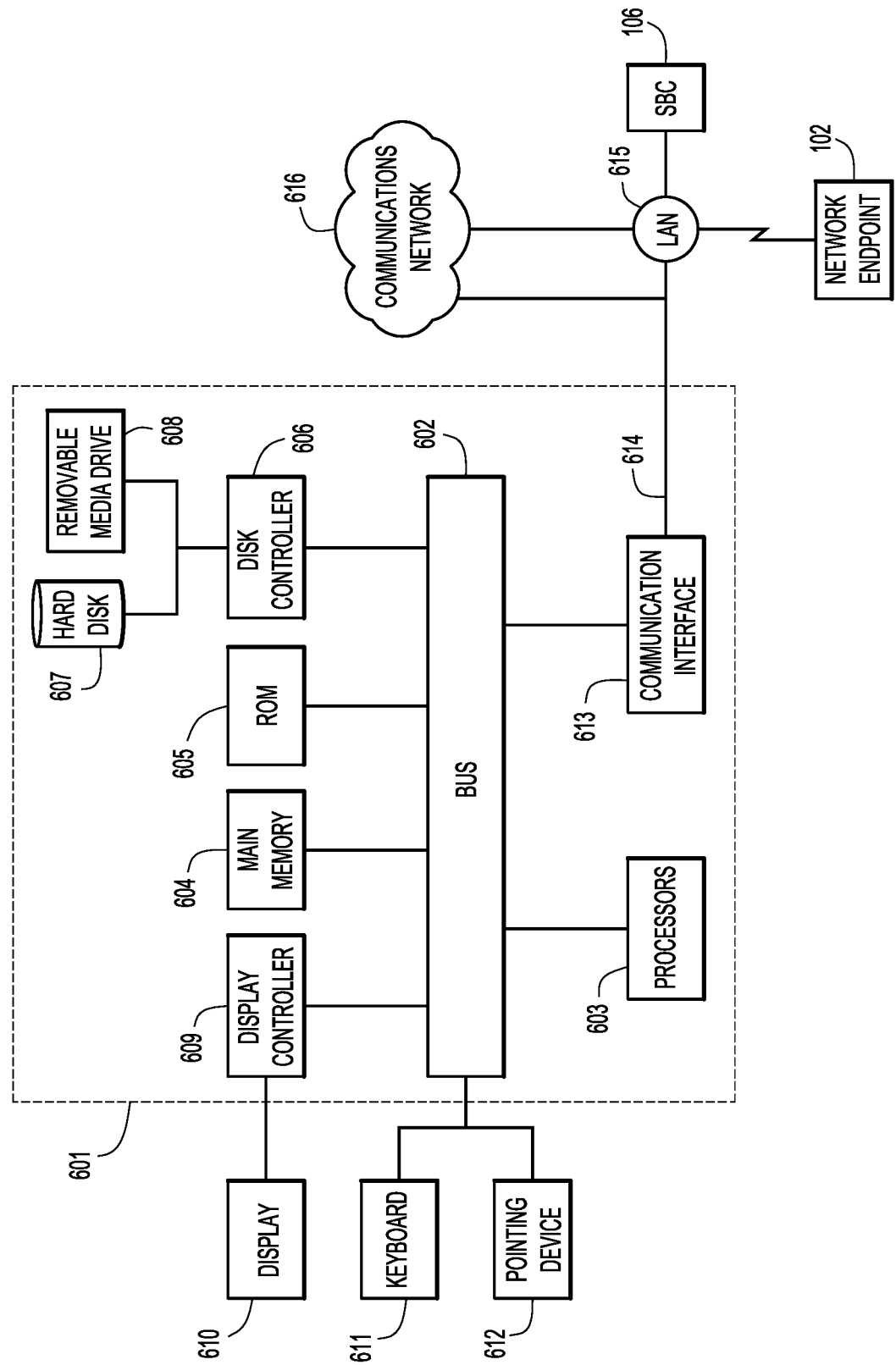
FIG. 6 is a block diagram of a call controller and an SBC configured to establish a secondary communication session between a first endpoint and a second endpoint when media degradation is detected, according to an example embodiment.

FIG. 6 is a block diagram showing a network element, such as the first call controller 104 or one of the SBCs 106(1)-106(3) shown in FIG. 1, configured to establish a secondary communication session between a first endpoint and a second endpoint, according to an example embodiment. FIG. 6 illustrates a computer system 601 upon which the embodiments presented may be implemented. In one aspect, the first call controller 104 or one of the SBCs 106(1)-106(3) may be deployed as virtual machines on the hardware of the computer system 601. The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603. The main memory 604 may also include the call control switchover logic 108 when the computer system 601 is a call controller and the media degradation detection logic 110 when the computer system 601 is an SBC.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a liquid crystal display (LCD), light emitting diode display (LED), for displaying information to a computer user. The computer system 601 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610.

The computer system 601 performs a portion or all of the processing steps of the process in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The computer system 601 can transmit and receive data, including program code, through the network(s) 615 and 616, the network link 614 and the communication interface 613. Moreover, the network link 614 may provide a connection through a LAN 615 to an SBC 106.

In summary, a method includes sending a data packet in a first communication session from a first endpoint to a second endpoint over a first call leg and receiving a data packet in the first communication session from the second endpoint to the first endpoint over the first call leg. Further, the method then determines whether performance of the communication session has degraded based on sent or received data packets. When the performance of the communication session has degraded, the method incorporates information associated with the performance of the communication session into a header of the received data packet and provides the received data packet to the first endpoint of the first communication session.

Further the method may also include receiving, from a call controller, a request to establish a second communication session, the request to establish the second communication session including a session identifier of the first communication session. In response to receiving the request to establish the second communication session, the method may then provide to the second endpoint a second call leg request, the second call leg request including the session identifier of the first communication session. In response to the second endpoint accepting the second call leg request, the method then establishes the second communication session with the second endpoint.

In another embodiment, the method also includes receiving a request to terminate the first communication session from the call controller. Then, in response to the request to terminate the first communication session, the method terminates the first communication session.

In another aspect, the information associated with the performance of the communication session includes at least one of a call leg identifier, a session identifier, packet loss metrics, packet delay metrics, or packet jitter metrics.

In another embodiment, the call leg identifier identifies at least one inbound call leg to the first endpoint and one outbound call leg to the second endpoint of the first communication session.

In yet another aspect, the header of the received data packet includes In-Situ Operation, Administration, and Maintenance (iOAM) data.

In another embodiment, the performance of the communication session has degraded when performance metrics of the communication session fall outside a predetermined range or threshold.

In another aspect, a method includes receiving, from a first endpoint communicating with a second endpoint in a first communication session, a request to establish a second communication session with the second endpoint. In response to receiving the request, the method directs a first network device to establish a communication session with the second endpoint. Further, the method includes receiving from the first network device a notification indicating that the network device has established the communication session with the second endpoint. Then, in response to the notification, the method directs the first endpoint to send communications to the second endpoint via the first network device.

In another embodiment, when the first communication session includes a second network device, which may be an SBC in the first communication session configured to send and receive communications from the first and second endpoints and which experiences quality degradation. Further, the second method includes terminating a communication session with the second network device after directing the first endpoint.

In a different aspect, the request to establish the second communication session includes an identifier of the first communication session, an identifier of a source of quality degradation in the first communication session, and a call leg identifier of one or more inbound and outbound call legs of the first communication session.

In another embodiment, the source of quality degradation in the first communication session is the second network device.

In another aspect, the method includes performing a lookup for the first network device based on the request in response to receiving the request.

In a different embodiment, the method includes providing to the first network device a second request with a header that includes an identifier of the first communication session.

In another aspect, the first network device is a session border controller.

In another embodiment, an apparatus including a communication interface configured to enable network communications and a processing device coupled with the communication interface is provided. The processing device is configured to receive, from a first endpoint communicating with a second endpoint in a first communication session, a request to establish a second communication session with the second endpoint. After receiving the request, the processing device directs a first network device to establish a communication session with the second endpoint. The processing device then receives from the first network device a notification indicating that the first network device has established the communication link with the second endpoint. In response to the notification, the processing device directs the first endpoint to send communications to the second endpoint via the first network device.

In another embodiment, an apparatus is provided that includes a communication interface configured to enable network communications and a processing device coupled with the communication interface. The processing device is configured to send a data packet in a first communication session from a first endpoint to a second endpoint over a first call leg of the first communication session. The processing device also receives a data packet in the first communication session from the second endpoint to the first endpoint over the first call leg. Based on the sent or received packets, the processing device determines whether performance of the first communication session has degraded. When the processing device determines that the performance of the first communication session has degraded, the processing device incorporates information associated with the performance of the communication session into a header of the received data packet. Moreover, the processing device also provides the received data packet to the first endpoint of the first communication session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   sending a first data packet in a first communication session from a first endpoint to a second endpoint over a first call leg of the first communication session;
   receiving a second data packet in the first communication session from the second endpoint to the first endpoint over the first call leg;
   determining whether performance of the first communication session has degraded based on the first data packet or the second data packet;
   when the performance of the first communication session has degraded:
      incorporating information associated with the performance of the first communication session into a header of the second data packet;
      providing the second data packet to the first endpoint of the first communication session;
      receiving a request to establish a second communication session, the request including an identifier of the first communication session;
      identifying the first communication session using the identifier of the first communication session; and
      using the identifier of the first communication session, establishing the second communication session in which at least one call leg of the first communication session is maintained and at least one other call leg of the first communication session that experienced degradation in the performance is replaced, wherein establishing the second communication session includes:
         in response to receiving the request to establish the second communication session at a first device from a call controller, providing to a second network device a call leg request that includes the identifier of the first communication session, and
         in response to the second network device accepting the call leg request, establishing the second communication session with the second endpoint.

2. The method of claim 1, further comprising:
   receiving a request to terminate the first communication session from the call controller; and
   in response to the request to terminate the first communication session, terminating the first communication session.

3. The method of claim 1, wherein the information associated with the performance of the first communication session comprises one or more of:
   a call leg identifier;
   packet loss metrics;
   packet delay metrics; or
   packet jitter metrics.

4. The method of claim 3, wherein the call leg identifier identifies at least one inbound call leg to the first endpoint and one outbound call leg to the second endpoint of the first communication session.

5. The method of claim 1, wherein the header of the second data packet includes In-Situ Operation, Administration, and Maintenance (iOAM) data.

6. A method comprising:
   sending a first data packet in a first communication session from a first endpoint to a second endpoint over a first call leg of the first communication session;
   receiving a second data packet in the first communication session from the second endpoint to the first endpoint over the first call leg;
   determining whether performance of the first communication session has degraded based on the first data packet or the second data packet;
   when the performance of the first communication session has degraded:
      incorporating information associated with the performance of the first communication session into a header of the second data packet by adding, to the header of the second data packet, an entity identifier of a source of a degradation of the performance, a type of the degradation of the performance, an inbound call leg identifier of the source, and an outbound call leg identifier of the source;
      providing the second data packet to the first endpoint of the first communication session;
      receiving a request to establish a second communication session, the request including an identifier of the first communication session;
      identifying the first communication session using the identifier of the first communication session; and
      using the identifier of the first communication session, establishing the second communication session in which at least one call leg of the first communication session is maintained and at least one other call leg of the first communication session is replaced, wherein the at least one other call leg experienced the degradation in the performance and is associated with the inbound call leg identifier and the outbound call leg identifier.

7. The method of claim 6, wherein the information associated with the performance of the first communication session comprises one or more of:
   a call leg identifier;
   packet loss metrics;
   packet delay metrics; or
   packet jitter metrics.

8. The method of claim 6, wherein the header of the second data packet includes In-Situ Operation, Administration, and Maintenance (iOAM) data.

9. The method of claim 6, further comprising:
after establishing the second communication session, terminating the first communication session.

10. The method of claim 9, wherein the first communication session involves a plurality of network devices and a first network device of the plurality of network devices is the source of the degradation of the performance, and wherein establishing the second communication session includes replacing the first network device.

11. The method of claim 10, further comprising:
selecting a second network device of the plurality of network devices to replace the first network device.

12. The method of claim 6, wherein determining whether the performance of the first communication session has degraded is based on detecting one or more of packet loss, packet delay, or packet jitter.

13. The method of claim 6, wherein establishing the second communication session
includes providing, to a call controller, a request to establish the second communication session, the request includes the entity identifier of the source of the degradation of the performance.

14. An apparatus comprising:
a communication interface configured to enable network communications;
a processing device coupled with the communication interface, and configured to perform operations comprising:
sending a first data packet in a first communication session from a first endpoint to a second endpoint over a first call leg of the first communication session;
receiving a second data packet in the first communication session from the second endpoint to the first endpoint over the first call leg;
determining whether performance of the first communication session has degraded based on the first data packet or the second data packet;
when the performance of the first communication session has degraded:
incorporating information associated with the performance of the first communication session into a header of the second data packet;
providing the second data packet to the first endpoint of the first communication session;
receiving a request to establish a second communication session, the request including an identifier of the first communication session;
identifying the first communication session using the identifier of the first communication session; and
using the identifier of the first communication session, establishing the second communication session in which at least one call leg of the first communication session is maintained and at least one other call leg of the first communication session that experienced degradation in the performance is replaced,
wherein the operation of establishing the second communication session includes:
in response to receiving the request to establish the second communication session, from a call controller, providing to a network device a call leg request that includes the identifier of the first communication session, and
in response to the network device accepting the call leg request, establishing the second communication session with the second endpoint.

15. The apparatus of claim 14, wherein the processing device is further configured to perform additional operations comprising:
receiving a request to terminate the first communication session from the call controller; and
in response to the request to terminate the first communication session, terminating the first communication session.

16. The apparatus of claim 14, wherein the information associated with the performance
of the first communication session comprises one or more of:
a call leg identifier;
packet loss metrics;
packet delay metrics; or
packet jitter metrics.

17. The apparatus of claim 14, wherein the header of the second data packet includes In-Situ Operation, Administration, and Maintenance (iOAM) data and wherein the apparatus is a session boarder controller.

18. The apparatus of claim 14, wherein the first communication session includes another network device that is a source of the degradation in the performance, and establishing the second communication session includes replacing the another network device.

19. The apparatus of claim 14, wherein the processing device is further configured to
perform an additional operation comprising terminating the first communication session after establishing the second communication session.

20. The apparatus of claim 14, wherein the processing device is configured to determine whether the performance of the first communication session has degraded by determining whether performance metrics, obtained from the first data packet or the second data packet, fall outside a predetermined range or threshold.

* * * * *